United States Patent Office 2,789,110
Patented Apr. 16, 1957

---

2,789,110

AMINO ALCOHOLS SUBSTITUTED BY BICYCLOALKYL RESIDUES AND A PROCESS OF MAKING SAME

Wilfrid Klavehn, Schwetzingen, Germany, assignor to Knoll A. G. Chemische Fabriken, Ludwigshafen (Rhine), Germany, a corporation of Germany No Drawing. Application March 5, 1954,
Serial No. 414,505

Claims priority, application Germany March 14, 1953

8 Claims. (Cl. 260—294.7)

The present invention relates to amino alcohols, and more particularly to amino alcohols substituted by bicycloalkyl residues, and to a process of making same.

Derivatives of 3-phenyl propanol-(3)-amine of the formula $C_6H_5(R) \cdot C(OH) \cdot CH_2 \cdot CH_2 \cdot NH_2$ wherein R is an alkyl, cycloalkyl, or aryl residue, possess, as is well known, spasmolytic properties. Said spasmolytic properties are especially exhibited by amino alcohols derived from 3-phenyl-3-cyclohexyl propanol-(3)-amine. Of said group of compounds morpholine and piperidine derivatives have proved to be particularly effective. According to the literature, such amino alcohols are valuable spasmolytic drugs. These known compounds, however, frequently cause obnoxious and disagreeable side-effects such as dry mouth, nausea, blurring of vision, giddiness, nervousness, tinnitus, tightness in the head, sore mouth, and even mental confusion. In such instances the drug must be temporarily discontinued for several days and then resumed at a lower level.

It is one object of the present invention to provide amino alcohols of a considerably improved spasmolytic activity which are considerably less toxic than said known compounds and which can be well tolerated.

Another object of the present invention is to provide a pharmaceutical preparation which is particularly useful as antispasmodic agent in the treatment of the syndrome of parkinsonism and which has a beneficial effect in that it improves involuntary tremor of the extremities and spasticity of the muscles.

The new saturated or unsaturated amino alcohol substituted by bicycloalkyl radicals according to the present invention correspond to the following structural formulas

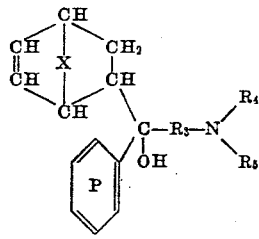

Unsaturated compound and

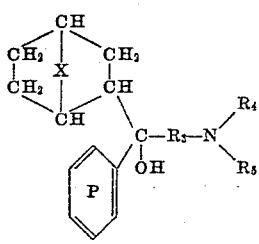

Saturated compound

In said formula X is an alkylene radical, $R_3$, $R_4$, and $R_5$ have the same meaning as indicated above, the phenyl radical P may be substituted by lower alkyl radicals or lower alkoxy groups, and the bicycloalkyl radical may be substituted by lower alkyl radicals.

A further object of the present invention is to provide a simple and effective process of producing said new valuable antispasmodic amino alcohols.

Other objects of this invention and advantageous features thereof will become apparent as the description proceeds.

In principle, the present invention consists in providing amino alcohols corresponding to the following formula

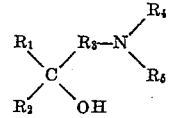

In said formula:

$R_1$ indicates a saturated or an unsaturated bicyclo-(2,2,1)-alkyl radical which may be substituted by lower alkyl radicals, such as methyl, ethyl, propyl, isopropyl radicals, $R_2$ is a phenyl radical which may be substituted by lower alkyl radicals, such as methyl or ethyl radicals, or by lower alkoxy groups, such as the methoxy or ethoxy group, $R_3$ is a straight chain or branched lower $\alpha,\beta$-alkylene radical, and $R_4$ and $R_5$ are saturated or unsaturated lower alkyl radicals, such as methyl, ethyl, propyl, isopropyl, or allyl radicals, or they form together with the nitrogen atom of the amino group, a heterocyclic ring, such as a pyrrolidine, piperidine or a morpholine ring.

Said compounds are produced according to this invention, by reacting saturated or unsaturated 1,3-amino ketones of the general formula

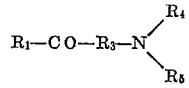

wherein $R_1$, $R_3$, $R_4$ and $R_5$ indicate the same radicals and groups mentioned above, with aromatic organometal compounds of the general formula

wherein $R_2$ indicates the same residue as mentioned above while Me is an organometallic residue, and hydrolyzing the resulting organo-metallic condensation products.

According to another embodiment of the present invention aromatic 1,3-amino ketones of the general formula

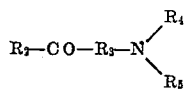

wherein $R_2$, $R_3$, $R_4$ and $R_5$ have the same meaning as indicated above, are reacted with saturated or unsaturated bicycloalkylated organo-metal compounds of the general formula

wherein $R_1$ and Me indicate the same residues as mentioned above, and hydrolyzing the resulting organo-metallic condensation products. If required, unsaturated amino alcohols obtained thereby are converted by hydrogenation into the corresponding saturated derivatives.

The preferred compound according to the present invention is 3-piperidino-1-phenyl-1-($\Delta_5$-bicyclo-(2,2,1)-heptenyl-2)-propanol-1. It is produced, for instance, either by condensing 3-piperidino-1-($\Delta_5$-bicyclo-(2,2,1)-heptenyl-2)-propanone-1 with phenyl magnesium halide or by reacting 3-piperidino-1-phenyl propanone-1 with (Δ5-bicyclo-(2,2,1)-heptenyl-2)-magnesium halide. Hydrogenation of said unsaturated reaction product, 3-piperidino-1-phenyl-1-(Δ5-bicyclo-(2,2,1)-heptenyl-2)-propanol-1, yields the corresponding saturated 3-piperidino-1-phenyl-1-(bicyclo-(2,2,1)-heptyl-2)-propanol-1. Said compound can also be produced by reacting 3-piperidino-1-(bicyclo-(2,2,1)-heptyl-2)-propanone-1 with phenyl magnesium halide or by condensing 3-piperidino-1-phenyl propanone-1 with (bicyclo-(2,2,1)-heptyl-2)-magnesium halide.

Other saturated or unsaturated bicycloalkyl radicals may be present as R1 in compounds according to this invention. Said bicycloalkyl radicals may also be substituted by other radicals and especially by lower alkyl radicals. For instance, 3-piperidino-1-phenyl-1-(7-isopropyl-6-methyl-Δ5-bicyclo-(2,2,2)-octenyl-2)-propanol-1 is obtained by condensing 3-piperidino-1-(7-isopropyl-6-methyl-Δ5-bicyclo-(2,2,2)-octenyl-2)-propanone-1 with phenyl magnesium halide.

Likewise, R2 may be another aryl residue such as an aryl residue with functional groups. For instance, 3-piperidino - 1 - p-tolyl-1-(Δ5-bicyclo-(2,2,1)-heptenyl-2)-propanol-1 is obtained by reacting 3-piperidino-1-(Δ5-bicyclo-(2,2,1) - heptenyl-2)-propanone-1 with p-tolyl magnesium halide or 3-piperidino-1-o-anisyl-1-(Δ5-bicyclo-(2,2,1)-heptenyl-2)-propanol-1 by reacting 3-piperidino-1-(Δ5-bicyclo-(2,2,1)-heptenyl-2)-propanone-1 with o-anisyl magnesium halide.

The new bases substituted by bicycloalkyl radicals are generally crystalline compounds. The can be distilled in a vacuum without decomposition. They form with inorganic or organic acids crystalline salts.

The following examples serve to illustrate the present invention without, however, limiting the same thereto.

Example 1

69.3 g. of 3-piperidino-1-phenyl-2-methyl propanone-1 of the summary formula $C_{15}H_{21}ON$ and the boiling point 165–168° C./7 mm.; produced by Mannich's reaction by reacting propio-phenone with formaldehyde and piperidine hydrochloride, are dissolved in 300 cc. of waterfree benzene. The resulting solution is added within about one hour at 0° C. to an ethereal organo-magnesium solution prepared from 96 g. of (Δ5-bicyclo-(2,2,1)-heptenyl-2)-chloride, produced according to Alder and Riokert (Liebigs Annalen vol. 543 (1939) page 24), 18.5 g. of magnesium shavings, and 300 cc. of water-free ether. The reaction mixture is boiled for half an hour under reflux. Thereafter the ether is removed by distillation, until the inside temperature reaches 65–70° C. The resulting benzene solution is added to 95 cc. concentrated hydrochloric acid containing ice for further processing. Thereby the greater part of the slightly water-soluble chlorohydrate of 3-piperidino - 1 - phenyl-1-(Δ5-bicyclo-(2,2,1)-heptenyl-2)-2-methyl propanol-1 of the summary formula $C_{22}H_{31}ON \cdot HCl$ and the melting point 252° C. precipitates. Precipitating a methanolic solution of said chlorohydrate by means of aqueous ammonia yields the free base in the form of a crystalline powder which, after recrystallization from methanol-water, melts at 130° C. Said base corresponding to the following structural formula

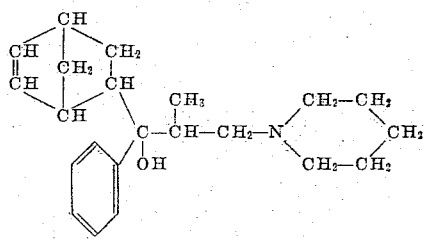

By treating the dilute hydrochloric acid filtrate of the reaction mixture with 200 cc. of 28% aqueous ammonia in the presence of ammonium chloride there can be obtained further amounts of the new amino alcohol and unreacted starting material. The total yield is between 70% and 75%.

Example 2

65 g. of 3-piperidino-1-phenyl propanone-1 of the summary formula $C_{14}H_{29}ON$, produced according to Mannich's reaction by reacting acetophenone with formaldehyde and piperidine hydrochloride are dissolved in 300 cc. of benzene. The resulting solution is added to an organo-magnesium solution prepared from 96 g. of (Δ5-bicyclo-(2,2,1)-heptenyl-2)-chloride, 18.5 g. of magnesium shavings, and 300 cc. of ether. The further procedure is the same as described in Example 1 and the resulting reaction mixture is worked up in the same manner. Thereby, 3-piperidino-1-phenyl-1-(Δ5-bicyclo-(2,2,1)-heptenyl-2)-propanol-1 of the summary formula $C_{21}H_{29}ON$ is obtained. Said compound melts at 101° C. and its chlorohydrate has a melting point of about 238° C. The compound is difficultly soluble in water, slightly soluble in ethanol, and readily soluble in methanol. Said base corresponds to the following structural formula

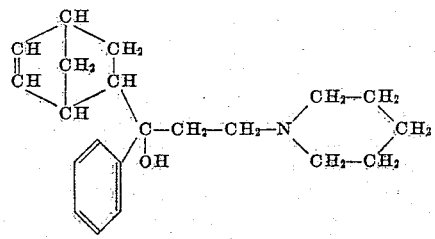

To produce therefrom the corresponding saturated amino alcohol, 31.1 g. of the base are dissolved in 100 cc. of N/2 sulfuric acid and the solution is hydrogenated at room temperature in the presence of 0.5 g. of platinum oxide catalyst. Almost the calculated amount of hydrogen is absorbed after about 3 hours. The aqueous solution is filtered and the free base is precipitated in the form of a crystalline powder by means of dilute ammonia. The resulting 3-piperidino-1-phenyl-1-(bicyclo-(2,2,1)-heptyl-2)-propanol-1 of the summary formula $C_{21}H_{31}ON$ boils at 175–177° C./7 mm. and, after recrystallization from acetone, melts at 105° C. The yield is 80–85%. Said base corresponds to the following structural formula

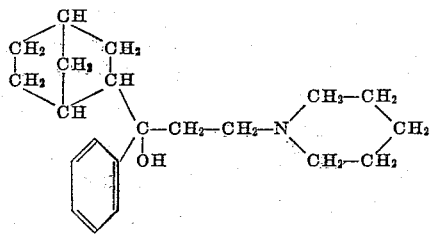

Example 3

22.1 g. of 3-diethylamino-1-(Δ5-bicyclo-(2,2,1)-heptenyl-2)-propanone-1 of the summary formula $C_{14}H_{23}ON$ and the boiling point 122–123° C./7 mm.; produced according to Mannich's reaction by reacting (Δ5-bicyclo-(2,2,1)-heptenyl-2)-ethanone of the summary formula $C_9H_{12}O$ with formaldehyde and diethylamine hydrochloride, are dissolved in 100 cc. of benzene. The unsaturated ketone $C_9H_{12}O$ is obtained according to Alder (Neue Methoden der präparativen organischen Chemie 1944 p. 303, note 125) by reacting cyclopentadiene with 3-butenone-2. The resulting solution is treated with a Grignard solution prepared from 42.5 g. of phenyl bromide, 7.2 g. of magnesium shavings, and 100 cc. of ether as described in Example 1. The reaction mixture is also worked up according to Example 1. 3-diethylamino-1-phenyl-1-(Δ5-bicyclo-(2,2,1)-heptenyl-2)-propanol - 1 of the summary formula $C_{20}H_{29}ON$ is obtained thereby, Said compound has a boiling point of 163–167° C./9 mm. Said base corresponds to the following structural formula

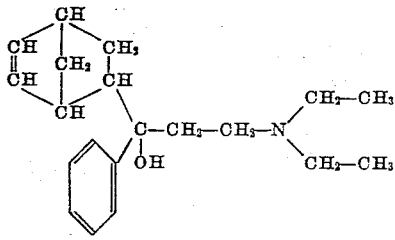

3-diallylamino-1-(Δ5-bicyclo-(2,2,1)-heptenyl-2) - propanone-1 produced by reacting (Δ5-bicyclo-(2,2,1)-heptenyl-2)-ethanone with formaldehyde and diallylamine hydrochloride, yields, in a similar manner, by reaction with phenyl magnesium bromide the 3-diallylamino-1-phenyl-1-(Δ5-bicyclo-(2,2,1)-heptenyl-2)-propanol-1 of the summary formula $C_{22}H_{29}ON$ and the boiling point 184–186° C./7 mm. Said base corresponds to the following structural formula

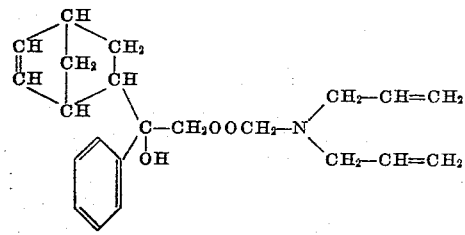

Example 4

21.9 g. 3-pyrrolidino-1-(Δ5-bicyclo-(2,2,1)-heptenyl-2)-propanone-1, of the summary formula $C_{14}H_{21}ON$, produced according to Mannich's reaction by reacting (Δ5-bicyclo-(2,2,1)-heptenyl-2)-ethanone of the summary formula $C_9H_{12}O$, with formaldehyde and pyrrolidine hydrochloride, boiling at 109–111° C./7 mm., are treated with phenyl magnesium bromide. 3-pyrrolidino-1-phenyl-1-(Δ5 - bicyclo-(2,2,1)-heptenyl-2)-propanol-1 of the summary formula $C_{20}H_{27}ON$, melting at 103° C. (from diluted acetone) is obtained. Said base corresponds to the following structural formula

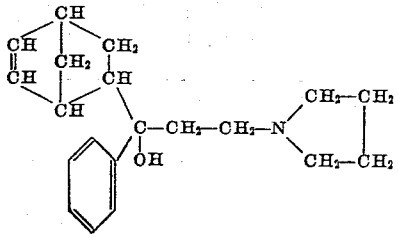

The hydrochloride of this base crystallized from water melts at 246° C.

Example 5

23.3 g. of 3-piperidino-1-(Δ5-bicyclo-(2,2,1)-heptenyl-2)-propanone-1 of the summary formula $C_{15}H_{23}ON$ and the boiling point 123–126° C./7 mm., produced according to Mannich's reaction by reacting (Δ5-bicyclo-(2,2,1)-heptenyl-2)-ethanone of the summary formula $C_9H_{12}O$ with formaldehyde and piperidine hydrochloride, are treated with phenyl magnesium bromide in the same manner as described in the preceding example. 3-piperidino-1-phenyl-(Δ5-bicyclo - (2,2,1) - heptenyl-2)-propanol-1 of the summary formula $C_{21}H_{29}ON$ is obtained thereby. Said compound on recrystallization from acetone, melts at 111° C. and its chlorohydrate at 271° C. The compound is the diastereomeric form of the unsaturated amino alcohol described in Example 2.

Catalytic hydrogenation in the presence of platinum oxide yields the same saturated compound as described in Example 2.

Example 6

23.5 g. 3-piperidino - 1 - (bicyclo-(2,2,1)-heptyl-1-propanone-1 of the summary formula $C_{15}H_{25}ON$, produced according to Mannich's reaction by reacting (bicyclo-(2,2,1)-heptyl - 2) - ethanone of the summary formula $C_9H_{14}O$ with formaldehyde and piperidine hydrochloride, boiling at 126–128° C./7 mm. (its hydrochloride melting at 186° C.), are treated with phenyl magnesium bromide as described above. The saturated ketone of the summary formula $C_9H_{14}O$ is obtained by hydrogenating the unsaturated ketone of the summary formula $C_9H_{12}O$ in presence of platinum oxide catalyst. 3-piperidino-1-phenyl - 1 - (bicyclo-(2,2,1)-heptyl-2)-propanol-1 of the summary formula $C_{21}H_{31}ON$ has a boiling point of 175–177° C./7 mm. and melts crystallized from acetone at 105° C., its hydrochloride at 263° C. (from ethanol).

Example 7

23.5 g. of 3-morpholino-1-(Δ5-bicyclo-(2,2,1)-heptenyl - 2) - propanone - 1 of the summary formula $C_{14}H_{21}O_2N$ and the boiling point 143–145° C./6 mm., produced according to Mannich's reaction by reacting (Δ5-bicyclo-(2,2,1)-heptenyl-2)-ethanone of the summary formula $C_9H_{12}O$ with formaldehyde and morpholine hydrochloride, are reacted, as described in Example 3, with phenyl magnesium bromide. 3-morpholino-1-phenyl-1-(Δ5-bicyclo - (2,2,1) - heptenyl-2)-propanol-1 of the summary formula $C_{20}H_{27}O_2N$ is obtained thereby. Said base corresponds to the following formula

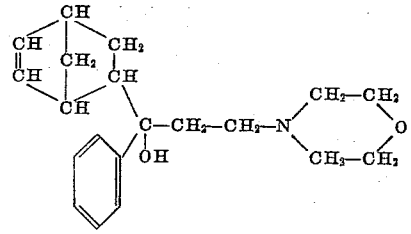

Said compound melts at 69.5° C. and its chlorohydrate, after recrystallization from methanol-ether, at 267° C.

Example 8

93 g. of 3-piperidino-1-(Δ5-bicyclo-(2,2,1)-heptenyl-2)-propanone-1 are dissolved in 400 cc. of benzene and reacted with an organo-magnesium solution prepared from 171 g. of p-tolyl bromide, 26.5 g. of magnesium shavings, and 400 cc. of ether in an analogous manner as described in the preceding examples. 3-piperidino-1-p-tolyl-1-(Δ5-bicyclo-(2,2,1)-heptenyl-2)-propanol - 1 of the summary formula $C_{22}H_{31}ON$ is obtained thereby. Said base corresponds to the following structural formula

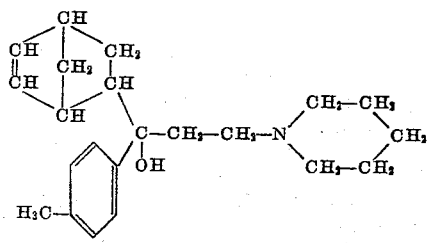

Said compound melts at 79° C., its chlorohydrate at 224° C.

Example 9

93 g. of 3-piperidino-1-(Δ5-bicyclo-(2,2,1)-heptenyl-2)-propanone-1 are reacted with o-anisyl magnesium-bromide prepared from 187 g. o-anisyl bromide, 26.5 g. of magnesium shavings, and 400 cc. of ether, in the same manner as described in Example 1. The resulting 3-piperidino-1-o-anisyl - 1 - (Δ5-bicyclo-(2,2,1)-heptenyl-2)-propanol-1 of the summary formula $C_{22}H_{31}O_2N$ has a melting point of 111° C. and corresponds to the following structural formula

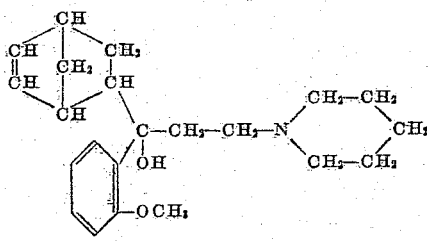

Its chlorohydrate melts at 215° C.

*Example 10*

30.3 g. of 3-piperidino-1-(7-isopropyl-6-methyl-Δ5-bicyclo-(2,2,2)-octenyl-2)-propanone-1 of the boiling point 170–175° C./7 mm., produced according to Mannich's reaction by reacting (7-isopropyl-6-methyl-Δ-5-bicyclo-(2,2,2)-octenyl-2)-ethanon of the summary formula $C_{14}H_{22}O$ with formaldehyde and piperidine hydrochloride, are dissolved in 100 cc. of benzene. The unsaturated ketone of the summary formula $C_{14}H_{22}O$ boiling at 121–123° C./8 mm. may be produced according to Alder by reacting α-phellandrene with 3-butenone-2. The resulting solution is reacted with an ethereal phenyl magnesium bromide solution prepared from 47.1 g. of phenyl bromide, 8 g. of magnesium shavings, and 100 cc. of ether, in the same manner as described in Example 1. 3 - piperidino - 1 - phenyl - 1 - (7 - isopropyl - 6 - methyl-Δ5 - bicyclo - (2,2,2) - octenyl - 2) - propanol - 1 of the summary formula $C_{26}H_{39}ON$ is obtained in the form of a viscous oil which boils at 235–238° C./7 mm. Said base corresponds to the following structural formula

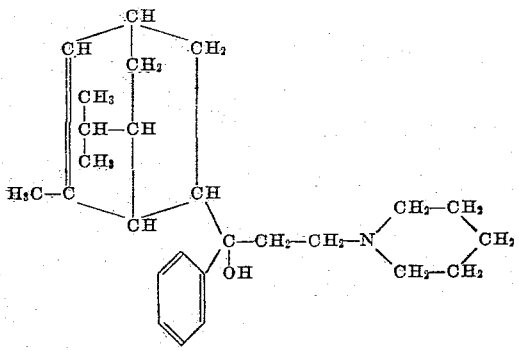

Its chlorohydrate melts at 91° C.

In place of the amino ketones used in the preceding examples there can be used equimolecular amounts of other amino ketones corresponding to the above given formula for instance, other 3-dialkylamino propanones than 3-diethylaminopropanones and 3-diallylamino propanones, such as the corresponding dimethylamino, dipropylamino, di-isopropylamino, dibutylamino propanones. The procedure of the preparation of the new bicyclic substituted aminoketones is illustrated by the following example.

*Example 11*

40.8 g. (Δ5-bicyclo-(2,2,1)-heptenyl-2)-ethanone of the summary formula $C_9H_{12}O$, produced according to Alder (Neure Methoden der präparativen organischen Chemie 1944, p. 303, note 125) by reacting cyclopentadiene with 3-butenone-2, B. P. 172° C./756 mm., 12,3 paraformaldehyde and 48.5 g. piperidine hydrochloride dissolved in 50 cc. ethanol are boiled under reflux during 3 hours. After distillation of the solvent water is added to the residue, the watery solution of the neutral parts is agitated with ether and then the basic constituent is precipitated with sodium carbonate. The base is dissolved in ether and the etheric solution is dried with potassium carbonate. After evaporating the solvent 3- piperidino - 1 - (Δ5 - bicyclo - (2,2,1) - heptenyl - 2)-propanone - 1 of the summary formula $C_{15}H_{23}ON$ is obtained in form of a viscous oil, which boils at 124–125° C./7 mm. Said ketone base corresponds to the following structural formula

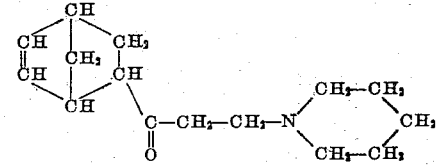

Its hydrochloride crystallized from methanol-ether melts at 174° C. Yield 55–65%.

In place of reactants having a p-tolyl or an o-anisyl residue, there can be employed reactants having other lower alkyl or alkoxy residues in the phenyl residue, such as the o-tolyl, p-anisyl, 2,6-xylyl, o-ethyl phenyl, o-ethoxy phenyl, 3,4-dimethoxy phenyl, residues.

In place of the organo-magnesium compounds, the reaction can also be carried out with the corresponding organo-sodium, organo-lithium, or organo-potassium compounds which yield the same final products.

As stated above, the new compounds are excellent spasmolytic agents which are employed in the treatment of parkinsonism. The 3-piperidino-1-phenyl-1-(Δ5-bicyclo-(2,2,1)-heptenyl-2)-propanol-1, produced according to Examples 2 and 5, exhibits remarkable anticholinergic properties. It is distinguished over atropine by a very high myospasmolytic activity. In high concentrations it has additionally a paralyzing effect upon the ganglionic control centers. The compound is superior to the known anticholinergic drugs, such as the chlorohydrate of α-cyclohexyl-α-phenyl-1-piperidino propanol and atropine, not only with respect to its better compatibility but also with respect to its antinicotinic activity as will be evident from the following tables showing the effective minimum concentrations (in mg.). In these tables the new 3-piperidino-1-phenyl-1-(Δ5-bicyclo-(2,2,1)-heptenyl-2)-propanol-1 is designated as A, the known α-cyclohexyl-α-phenyl-1-piperidino propanol as B, and atropine as C.

|   | Tested on the isolated guinea pig intestines according to Magnus after administration of— | | Blood pressure (cat) according to Trendelenburg after administration of— | |
|---|---|---|---|---|
|   | 0.02 mg./l. of acetylcholine | 100 mg./l. of $BaCl_2$ | 0.18/kg. acetylcholine | electrical vagus stimulation |
| A | 0.012 | 20.0 | 0.2 | 0.2 |
| B | 0.06 | 100.0 | 0.2 | 0.5–1.0 |
| C | 0.003 | 300.0 | 0.0005 | 0.005 |

|   | Antagonism to nicotine spasms (mouse) according to Haardt and Hotovy, Arch. exp. Pathol. a. Pharmakol. 168, 307 (1932) | Inhibition of saliva flow (rabbits) on administration of 2.0 mg. of pilocarpine/kg. 50% dose effective | Enlargement of pupil (mouse) 50% according to Pulewka Arch. exp. Pathol. and Pharmakol. 168, 307 (1932) |
|---|---|---|---|
| A | 4.8 | 0.34 | 0.64 |
| B | 21.3 | 0.38 | 0.62 |
| C | 30.0 | 0.12 | 0.11 |

| Toxicity on mice, L. D. 50% | subcutaneously in mg./kg. | intravenously in mg./kg. |
|---|---|---|
| A | 195 | 56 |
| B | 202 | 41 |
| C | 800 | 78 |

The antinicotinic activity of the new compound A is more than 4 times stronger than that of the highly active compound B and more than 6 times stronger than that of atropine. Its effect upon blood pressure, inhibition of saliva flow, and enlargement of the pupils is much less pronounced than that of atropine and about the same as that of compound B. Its toxicity is about the same as that of compound B.

Another very effective compound is the 3-piperidino-1-phenyl-1-(bicyclo-(2,2,1)-heptyl-2)-propanol - 1. In following table this compound is tested in the same manner as described above:

| Antagonism 50% dose effective guinea pig intestines. | to acetylcholine 0.02 mg./l. 0.013. | to $BaCl_2$ 100 mg./l. 20.0. |
|---|---|---|
| Removing the blood pressure reaction (cat). | after 0.1γ/kg. of acetylcholine, 0.5. | electrical vagus stimulation, 1.0. |
| Antagonism to nicotine spasm (mouse). | 26.2. | |
| Enlargement of pupil (mouse) 50%. | 5.0. | |
| Toxicity on mouse, 50% L. D. | subcutaneously, mg./kg., 230.0. | intravenously, 32.0. |

Said new compound A was clinically tested with success in the treatment of the syndrome of parkinsonism. The compound has proved to be superior to compound B in many instances. Tablets, each containing 2 mg. of said new compound A, were orally administered in a dosage between 1 mg. and 5 mg. three times daily, especially 2 tablets of 2 mg. three times daily. Ampoules containing 1 cc. of a 0.5% solution of A may be used for injections.

It was found, that after administration of A in the treatment of parkinsonism the tremor is diminished, the rigor and dolorous spasms are loosened, the speech becomes clear. The compound if desired may be combined with other substances such as scopolamine or β-cyclohexyl-methylaminopropane which in many cases enhance its effect. The combination with antihistamines also is found advantageously.

The new therapeutically active compounds preferably are not used in their original form but diluted, thus allowing better and more economical use to be made thereof. They are preferably administered perorally in the form of liquid or solid preparations of their salts with inorganic or organic acids, such as hydrochlorides, hydrobromides, sulfates, phosphates, nitrates, citrates, tartrates, benzoates.

The new compounds and their salts with acids compatible to the human and animal organism are administered to human patients and animals in the form of tablets, pills, powders, capsules, solutions, emulsions, suspensions, dispersions, and in any other suitable form.

In the case of powders, a fine even dispersion of the active product is of importance. Such a fine dispersion can be achieved, for example, by intimately mixing and milling the compound, for instance in a ball mill with a solid, pulverulent extending agent to the desired degree of fineness or by impregnating the already milled, finely powdered, solid carrier with a mixture of the active compound in water or another suitable solvent and then removing water or solvent.

A fine dispersion of the compound can also be brought about by emulsifying said product with the aid of a dispersing or emulsifying agent.

When preparing tablets, pills, powders and the like which are used in human therapy, the commonly used diluting agents, binders, and the like are employed, such as sugar, lactose, talcum, starch, bolus alba, pectin, and as binders, gelatin, gum arabic, methyl cellulose, yeast extract, agar, tragacanth and others.

The content of active compound in such preparations may vary. It is necessary that the active compound is present in said preparations in such an amount that a suitable dosage will be ensured. Ordinarily the preparations should not contain less than 0.1% of the active compound. The preferred amounts to be employed are between 1% and 2% of the preparation. To use greater amounts is also possible although administration of suitable doses becomes more difficult. Tablets containing, for instance, between about 1 mg. and 5 mg. and preferably about 2 mg. of the active compound per tablet have proved to be especially suitable.

Of course, many other forms of preparations may be made and used in therapy and for other purposes by those skilled in the art in accordance with the principles set forth herein and in the claims annexed hereto.

I claim:

1. An amino alcohol compound selected from the group consisting of an amino alcohol of the formula

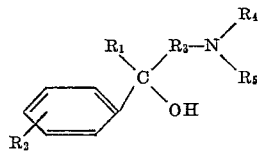

wherein $R_1$ is a member selected from the group consisting of the bicyclo(2,2,1)heptenyl-2 radical, the bicyclo(2,2,1)heptyl-2 radical, and the bicyclo(2,2,2)octenyl-2 radical; $R_2$ is a member selected from the group consisting of hydrogen, the methyl radical in para-position, and the methoxy group in ortho-position; $R_3$ is a member selected from the group consisting of the ethylene radical and the 2-methyl ethylene radical; and $R_4$ and $R_5$ are members selected from the group consisting of the ethyl radical, the allyl radical, and $R_4$ and $R_5$, together with the nitrogen atom, to which they are attached, forming a piperidine ring, a morpholine ring, and a pyrrolidine ring, and the substantially non-toxic acid addition salts of said amino alcohol.

2. 3-piperidino-1-phenyl-1-(Δ5-bicyclo-(2,2,1)-heptenyl-2)-propanol-1 in their diastereomeric forms.

3. 3-piperidino-1-phenyl-1-(Δ5-bicyclo-(2,2,1)-heptenyl-2)-propanol-1, having a melting point at 111° C., hydrochloride melting at 271° C.

4. 3 - pyrrolidino-1-phenyl-1-(Δ5-bicyclo-(2,2,1)-heptenyl-2)-propanol-1.

5. 3-piperidino-1-phenyl-1-(Δ5-bicyclo-(2,2,1)-heptenyl-2)-2-methyl propanol-1.

6. 3-piperidino-1-phenyl-1-(Δ5-bicyclo(2,2,1)-heptenyl-2)-propanol-1, having a melting point of about 101° C., its hydrochloride melting at about 238° C.

7. The hydrochloride of 3-piperidino-1-phenyl-1-(Δ5-bicyclo-(2,2,1)-heptenyl-2)-propanol-1 having a melting point of about 271° C.

8. The substantially non-toxic acid addition salts of 3 - piperidino - 1-phenyl-1-(Δ5-bicyclo(2,2,1)heptenyl-2)-propanol-1 having a melting point of about 111° C.

References Cited in the file of this patent
UNITED STATES PATENTS

| 2,680,115 | Ruddy | June 1, 1954 |
| 2,716,121 | Denton | Aug. 23, 1955 |
| 2,723,269 | Denton | Nov. 8, 1955 |

OTHER REFERENCES

Kazanskii et al.: Doklady Akademii Nauk Soyuza Sovetskikh, vol. 72, pp. 57–60; abstracted in Chemical Abstracts, vol. 45, col. 1545 (b) 1950.

Alder et al.: Justus Liebigs Annalen der Chemie, vol. 525, pp. 183–221.

Fawcett, Chemical Reviews, vol. 47, pp. 219–274 (1950).